(12) United States Patent
Ishikawa

(10) Patent No.: US 7,133,150 B2
(45) Date of Patent: Nov. 7, 2006

(54) IMAGE FORMING DEVICE FOR IMAGE OUTPUT FORM CONTROL

(75) Inventor: Katsutoshi Ishikawa, Nara (JP)

(73) Assignee: Sharp Kabushiki Kaisha, Osaka (JP)

( * ) Notice: Subject to any disclaimer, the term of this patent is extended or adjusted under 35 U.S.C. 154(b) by 889 days.

(21) Appl. No.: 09/725,768

(22) Filed: Nov. 30, 2000

(65) Prior Publication Data

US 2001/0038463 A1 Nov. 8, 2001

(30) Foreign Application Priority Data

Nov. 30, 1999 (JP) .............................. H11-339250

(51) Int. Cl.
G06F 15/00 (2006.01)
(52) U.S. Cl. ..................... 358/1.16; 358/1.9; 358/1.15; 358/449; 399/82
(58) Field of Classification Search ............... 358/1.16, 358/1.15, 1.17, 449; 271/9.06; 399/82
See application file for complete search history.

(56) References Cited

U.S. PATENT DOCUMENTS

| | | | |
|---|---|---|---|
| 5,442,732 A | 8/1995 | Matysek et al. | |
| 5,825,988 A * | 10/1998 | Collard et al. ............. | 358/1.13 |
| 5,918,988 A * | 7/1999 | H.A.M. Van Oijen ........ | 400/76 |
| 5,940,582 A * | 8/1999 | Akabori et al. ............ | 358/1.13 |
| 5,946,527 A * | 8/1999 | Salgado et al. .............. | 399/82 |
| 5,987,226 A * | 11/1999 | Ishikawa et al. ........... | 358/1.13 |
| 5,991,516 A * | 11/1999 | Desmond et al. .......... | 358/1.17 |
| 6,173,338 B1 * | 1/2001 | Fukuta .......................... | 710/5 |
| 6,198,548 B1 * | 3/2001 | Yoshikawa et al. ......... | 358/498 |
| 6,206,360 B1 * | 3/2001 | Urata et al. ................ | 271/9.06 |
| 6,433,884 B1 * | 8/2002 | Kawakami ................. | 358/1.15 |
| 6,498,656 B1 * | 12/2002 | Mastie et al. .............. | 358/1.15 |
| 6,507,858 B1 * | 1/2003 | Kanerva et al. ............ | 715/515 |
| 6,529,286 B1 * | 3/2003 | King ......................... | 358/1.14 |
| 6,621,589 B1 * | 9/2003 | Al-Kazily et al. ......... | 358/1.15 |
| 6,687,018 B1 * | 2/2004 | Leong et al. .............. | 358/1.15 |
| 6,707,574 B1 * | 3/2004 | Freeman et al. ............. | 358/1.9 |

FOREIGN PATENT DOCUMENTS

| | | |
|---|---|---|
| JP | 09-222997 | 8/1997 |
| JP | 11-129586 | 5/1999 |
| JP | 2000-222157 | 8/2000 |
| JP | 2001-134394 | 5/2001 |
| JP | 2001-134395 | 5/2001 |
| JP | 2001-136364 | 5/2001 |

* cited by examiner

OTHER PUBLICATIONS

European Patent Office Search Report.

*Primary Examiner*—Joseph R. Pokrzywa
*Assistant Examiner*—Mark R. Milia
(74) *Attorney, Agent, or Firm*—David G. Conlin; John J. Penny, Jr.; Edwards Angell Palmer & Dodge LLP

(57) ABSTRACT

An image forming device comprising a job storage means 11 connected to a network for storing jobs input through the network composed of a group of image data to be output, a job select means 12 for selecting various arbitrary jobs out of the jobs stored to the job storage means, a job output means 13 for combining the jobs selected by the job select means and outputting the same as one job, an output form comparison means 14 for comparing each of the image output forms of each job selected by said job select means, and a display means 16 for notifying that a job having different output form compared to the other forms of jobs is included in the selected jobs.

5 Claims, 7 Drawing Sheets

Fig. 5

Please select jobs in the order of output.

Build-job

| Category | | job name | size | pages | processing | time |
|---|---|---|---|---|---|---|
| Copy | 1 | copy 1 | A4 | 8 | staple | 10:20 |
| Print | 2 | report 1 | A4 | 10 | . | 10:35 |
| Copy | 3 | copy 2 | B4 | 2 | . | 10:38 |

1/1

Close

Return

OK → to next screen

Cancel order  2  1 ← job numbers are displayed in the selected order

IMAGE FORMING DEVICE FOR IMAGE OUTPUT FORM CONTROL

DETAILED DESCRIPTION OF THE INVENTION

1. Field of the Invention

The present invention relates to an image forming device so-called a digital compound machine, that functions both as a copier and a facsimile machine, and even further functions as a printer connected to a network that prints data input through the network.

2. Description of the Related Art

The image forming device connected to a network is shared and used by plural users. Therefore, when creating a document for a project and the like, the image forming device is required to gather printing jobs requested from a plurality of users and output them as one. Japanese Patent Laid-Open Publication No. 11-129586 discloses a typical prior art system realizing such request. According to the disclosure, out of the plural printing jobs stored in a memory, the desired printing jobs are selected and combined in the desired order for output, and if necessary, the printed documents may be stapled before output.

Problems to be Solved By the Invention

According to such prior art disclosure, various printing jobs are simply gathered together for output. However, when the forms of output of each of the printing jobs differ, for example, with one job designating an A4 size paper for output and another job designating a B4 size paper for output, the device will either automatically unify the size of the paper, or discontinue the process. Moreover, the post-processing of the output, such as stapling, could only be selected for the whole job group, and could not be set for the respective jobs in a job group.

The present invention aims at solving the above-mentioned problems of the prior art by providing an image forming device, wherein if it is requested to gather plural printing jobs as one job group and output the same, capable of notifying the existence of printing jobs having different forms of output in one group, and enabling to either unify the output forms of the plural jobs or to output the plural jobs with different forms of output.

Means to Solve the Problem

In order to solve the problems of the prior art, the present invention provides an image forming device comprising a job storage means connected to a network and storing a group of jobs composed of image data input through the network for forming images; a job select means for selecting different arbitrary jobs from the group of jobs stored to the job storage means; and a job output means for concatenating the jobs selected by the job select means and outputting the concatenated jobs as one job; wherein the image forming device further comprises an output form comparison means for comparing the image output forms of each of the jobs selected by the job select means; and an informing means for informing the user of the existence of jobs having different output forms.

According to such features of the invention, the user can be informed of the fact that the statuses of output of the images, such as the paper sizes, differ within the concatenated jobs including different jobs input through the network, and therefore, will be able to take necessary action.

The image forming device according to the invention further characterizes in that the informing means informs which area of image output form of a job having the different output form is different from the forms of other jobs.

According to this feature of the invention, it is made clear to the user which area of output form of a job is different from the forms of other jobs, such as the recording paper size, or the necessity of postprocessing such as stapling and the like, and the different area is notified to the user in detail. Based on the displayed notice, the user will be able to understand the status of the job easily.

Moreover, the image forming device according to the present invention characterizes in that the recording material on which said image data is to be reproduced through said job output means can be respectively designated for each of said jobs selected by said job select means.

According to this feature of the invention, even during the image output of concatenated jobs, necessary recording materials could be selected for use when printing a certain portion of the concatenated jobs, in order to complete an expressive document. For example, the important pages or pages that should be highly emphasized can be printed out in full color.

The present invention further characterizes in that if the different output form is related to a predetermined form, confirmation is made on whether or not to unify the output forms.

According to this feature of the invention, when the difference in the output forms relate to a predetermined form, such as the size of the recording paper or the request for stapling, confirmation message is provided to the user asking whether or not to unify the size of the paper or the request for stapling. When unification is requested, for example, by the user pressing the unification button, the output forms are automatically unified. Therefore, there is no need for the user to designate the same output form for the respective jobs in a job group, and the operation is even further simplified.

Moreover, the present invention characterizes in that if the different output form is related to a predetermined form, each of the jobs are output with different output forms but as one sequential job as a whole.

According to this feature of the invention, when the differences of forms are related to a predetermined form, such as the request for stapling, the jobs with different forms of output are output as requested according to their original forms of output. That is, when the first and second jobs do not request stapling and only the third job requests stapling, the first, second and third jobs are output as one sequential job group while only the third job is provided with the stapling process. Accordingly, the printed document will be completed as desired by the user.

In the present specification, the "jobs composed of image data input through the network for forming images" stored to the job storage means include not only jobs composed of "a group of image data input through the network for forming images" but also jobs composed of "a group of image data for forming images input either through a scanner (original copy reading unit) formed integrally with the image forming device or through a scanner formed separately from the image forming device and being connected to the image forming device". In other words, the term "network" used in the claims includes not only a normal communication network but also the state where a scanner is connected to and is capable of communicating with the image forming device.

BRIEF DESCRIPTION OF THE DRAWINGS

FIG. 5 is an example of the display showing the stored jobs;

DETAILED DESCRIPTION OF PREFERRED EMBODIMENTS

Figure 1:
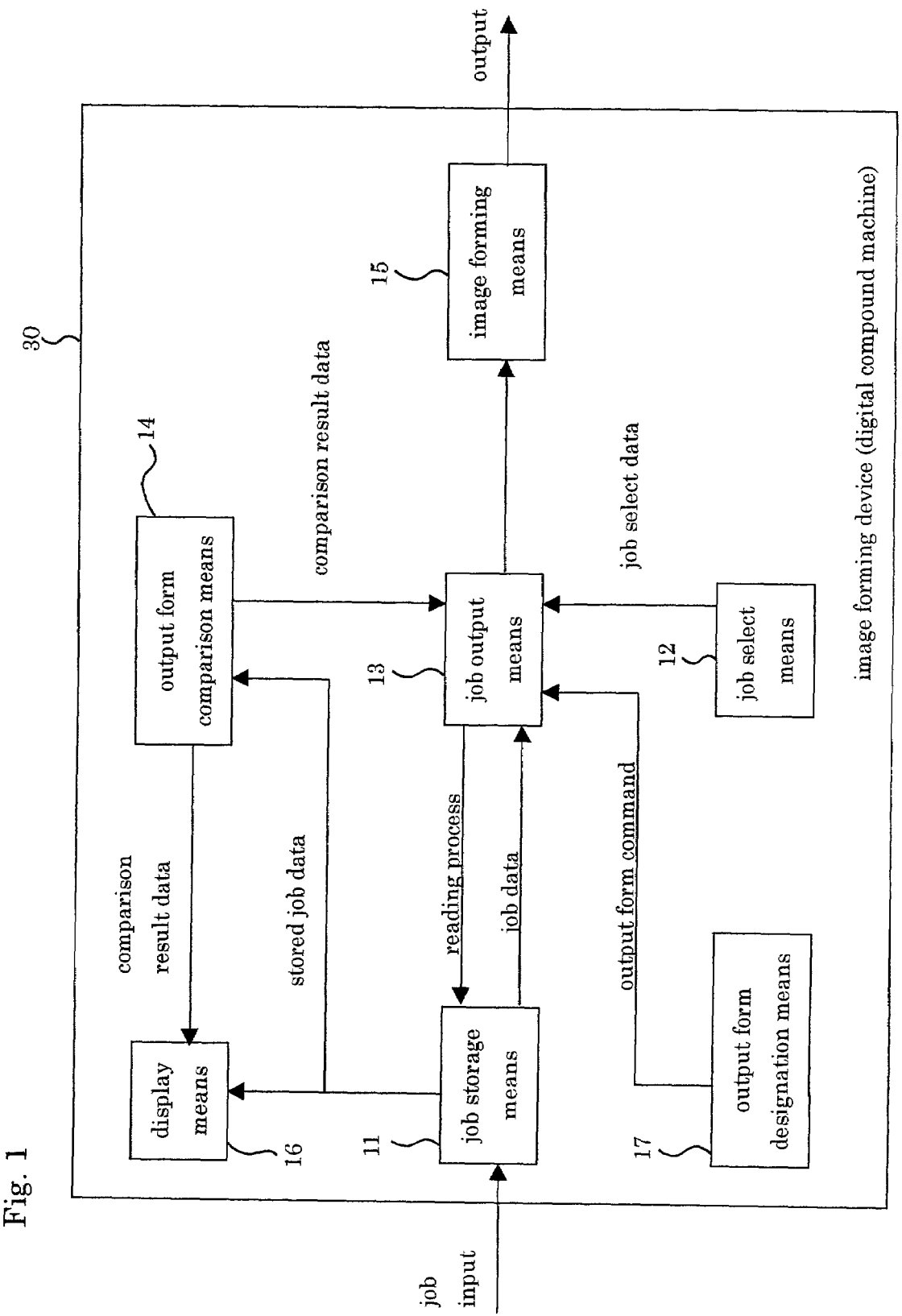
FIG. 1 is a block diagram explaining the functional configuration of the image forming device according to the present invention.

The functional composition of the image forming device connected to a network according to an embodiment of the present invention will now be explained with reference to the functional block diagram of FIG. 1.

The image forming device (digital compound machine) 30 connected to a network according to the present invention comprises a job storage means 11 for storing a job comprised of a group of image data for forming images that is input via the network, a job select means 12 for selecting mutually different arbitrary jobs out of the plural jobs stored at the job storage means, a job output means 13 for concatenating the jobs selected by the job select means 12 and outputting the same as one job, an output form comparison means 14 for comparing the image output forms of the jobs selected by the job select means 12, an image forming means 15 for printing and outputting the job being output from the job output means 13, a display means 16 for displaying data such as the storage job data related to the job stored to the job storage means or the comparison result data output from the output comparison means, and an output form designation means 17 for commanding the output form, such as matching the output forms of a series of jobs or differing the output forms of each job, based on the result of comparison displayed on the display means 16.

Figure 2:
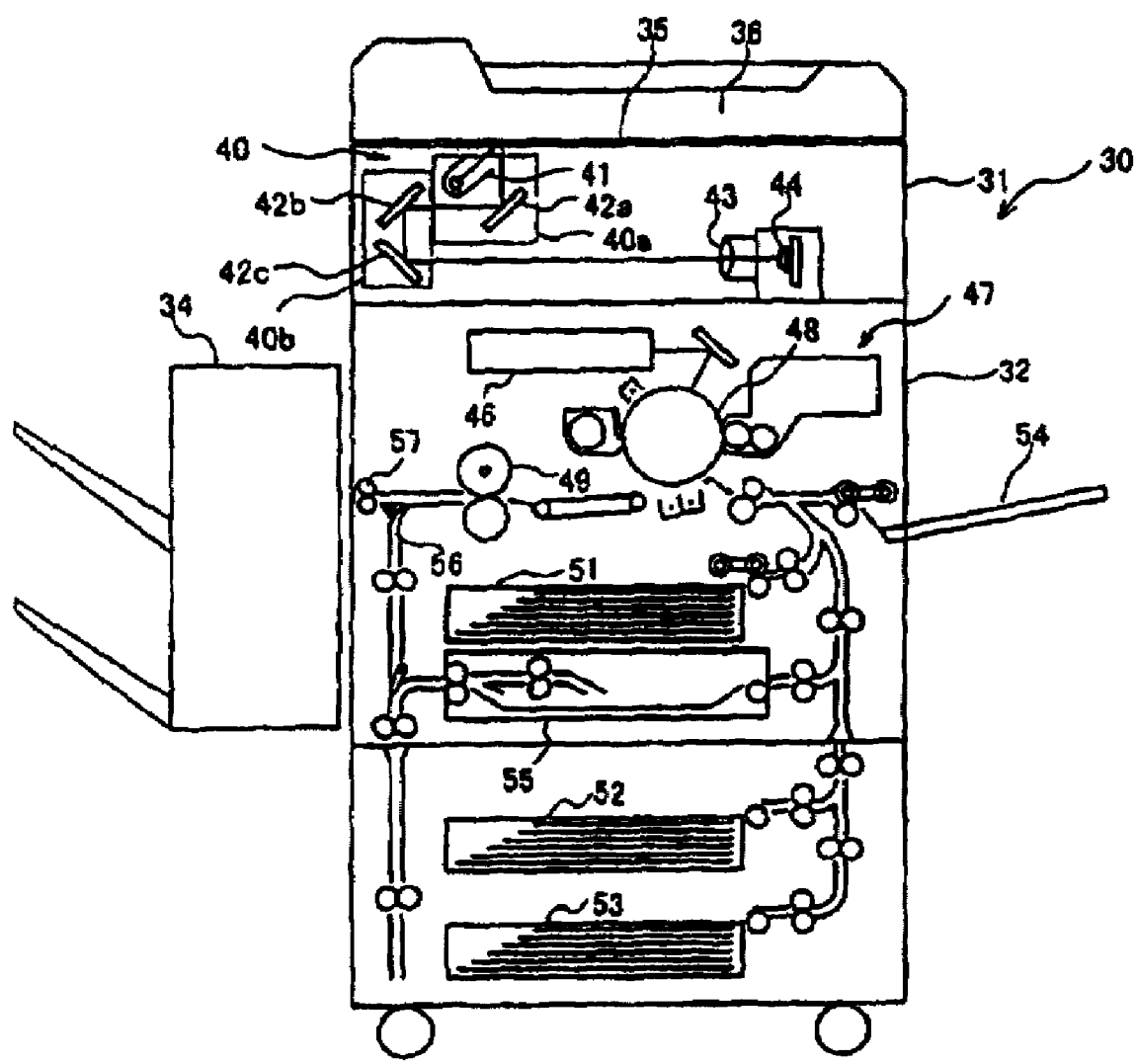
FIG. 2 is an explanatory view showing the composition of the image forming means in the image forming device according to the present invention.

With reference to FIG. 2, the composition of the image forming means of the image forming device (digital compound machine) 30 is explained. An automatic copy conveyance device 36 is equipped above a copy platform 35 formed of transparent glass in the image forming device (digital compound machine) 30. The automatic copy conveyance device 36 is for automatically providing the original copy having plural number of pages set on the copy set tray one page at a time to the copy platform 35.

Under the copy platform 35 is a copy reading unit 31 to which a scanner 40 is equipped. The scanner 40 is for scanning and reading the image of the original copy mounted on the copy platform 35. The scanner 40 comprises a lamp reflector assembly 41 for exposing the copy surface, a first scan unit 40a equipped with a first reflection mirror 42a that reflects the catoptric light (reflection) from the original copy for introducing the reflected image from the original copy to the photoelectric transformation element or CCD, a second scan unit 40b equipped with second and third reflection mirrors 42b, 42c for introducing the reflected image from the first reflection mirror 42a to the CCD 44, an optical lens 43 for imaging the reflected image from the original copy via the reflection mirrors onto the CCD that transforms the image into electric image signals, and the CCD 44 that transforms the reflected image from the original copy to electric image signals.

Moreover, by the movement in association with the automatic copy conveyance device 36, the scanner 40 reads the image on the copy, which is automatically conveyed by the automatic copy conveyance device 36, at a predetermined exposure position.

The copy image read into the scanner 40 is transmitted as image data to an image data input unit not shown, and after performing a predetermined image process to the image data, the data is temporarily stored in the memory of the image processing unit. Then, in response to an output request, the image data stored in the memory is output and transferred to a laser writing unit 46.

The laser writing unit 46 includes a semiconductor laser light source that outputs laser beam according either to the image data read out from the memory or the image data transferred from an exterior device, a polygon mirror for performing equal angular velocity deflection of the laser beam, an f-θ lens for correcting the laser beam performed of the equal angular velocity deflection so that it is deflected with equal angular velocity on a photosensitive drum 48 that constitutes an image forming unit 32, and so on.

The image forming unit 32 placed surrounding a known photosensitive drum 48 is equipped with an electrifier for electrifying the photosensitive drum 48 to a predetermined electric potential, a developer for supplying toner to and distinguishing the electrostatic latent image formed on the photosensitive drum 48, a transfer device (not shown) for transferring the toner image formed on the surface of the photosensitive drum 48 to a recording paper, a cleaner for retrieving excessive toner, a dielectrifier, and so on.

The copy image scanned by the scanner 40 is temporarily stored at the image memory, and then output to the laser writing unit 46 that scans laser beam to the surface of the photosensitive drum 48, forming electrostatic latent image. The latent image is then distinguished by the toner within the developer as toner image, which is then electrostatically transferred onto the record paper or sheet body through a transfer device, and thereafter, conveyed to a fixing unit 49.

Other than the fixing unit 49, the discharge side of the image forming unit 32 is equipped with a switch back path 56 for reversing the front side and the back side of the recording paper in order to form another image on the back surface of the paper, and a postprocessing device 34 including an elevating tray and providing a stapling process and the like to the recording paper on which the image is formed. The recording paper to which the toner image is fixed through the fixing unit 49 is guided by a discharge roller 57 to the postprocessing device 34 via the switch back path 56, if necessary, where predetermined postprocessing is provided before being discharged.

The paper feed unit is placed under the image forming unit 32, and is equipped with a manual tray 54, a perfecting unit 55, a multiple paper-feed tray unit equipped with paper cassettes 51, 52 and 53, and a conveyance means for conveying the paper fed from the paper cassettes 51, 52 or 53 or from the manual tray 54 to the transfer position where the transfer device of the image forming unit 32 is positioned. A perfecting unit 55 is communicated to the switch-back path 56 for reversing the record paper, and is used when forming images on both sides of the recording paper.

Figure 3:
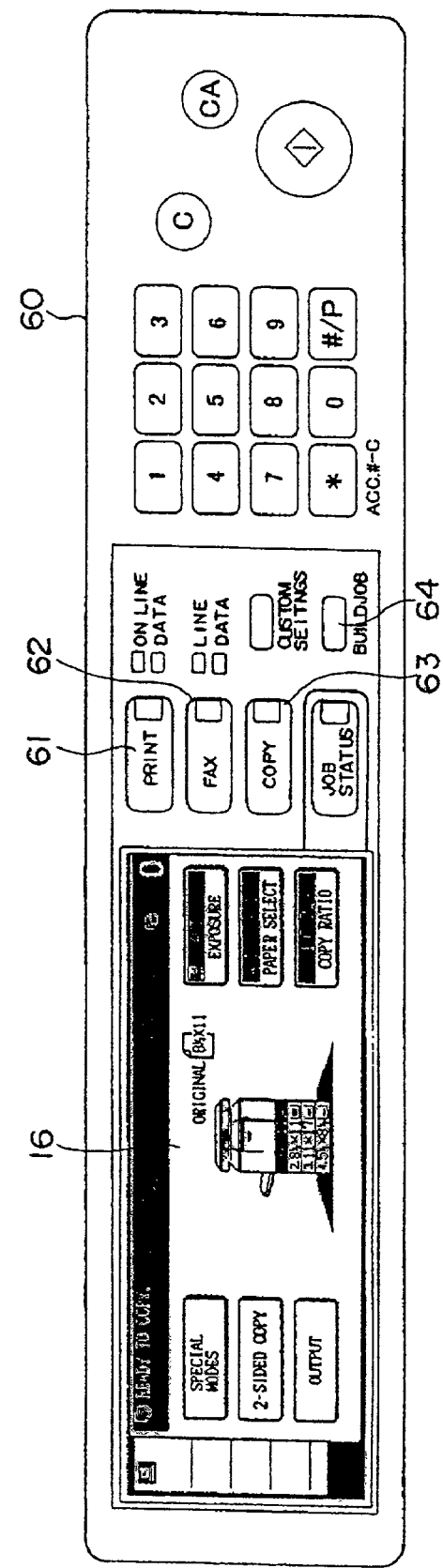
FIG. 3 is a drawing showing the form of a control panel in the image forming device.

FIG. 3 is a front view showing the structural example of a control panel 60 of the image forming device (digital compound machine) 30. The control panel 60 is equipped with a display unit 16 that displays the status of the digital compound machine, displays information such as comparison result data, or displays input order, a numeric key pad for inputting numerals, a clear button for canceling set conditions and the like, a start button for ordering to start an operation, a printer mode button 61, a facsimile mode button 62 and a copy mode button 63 for selecting the operation mode of the machine, and a build-job button 64 that is characteristic to the present invention.

The digital compound machine 30 is at stand-by in the copy mode as shown in FIG. 3. By pressing the mode button 61, 62 or 63, the operation mode may be switched to the printer mode, the facsimile mode or the copy mode.

Figure 4:
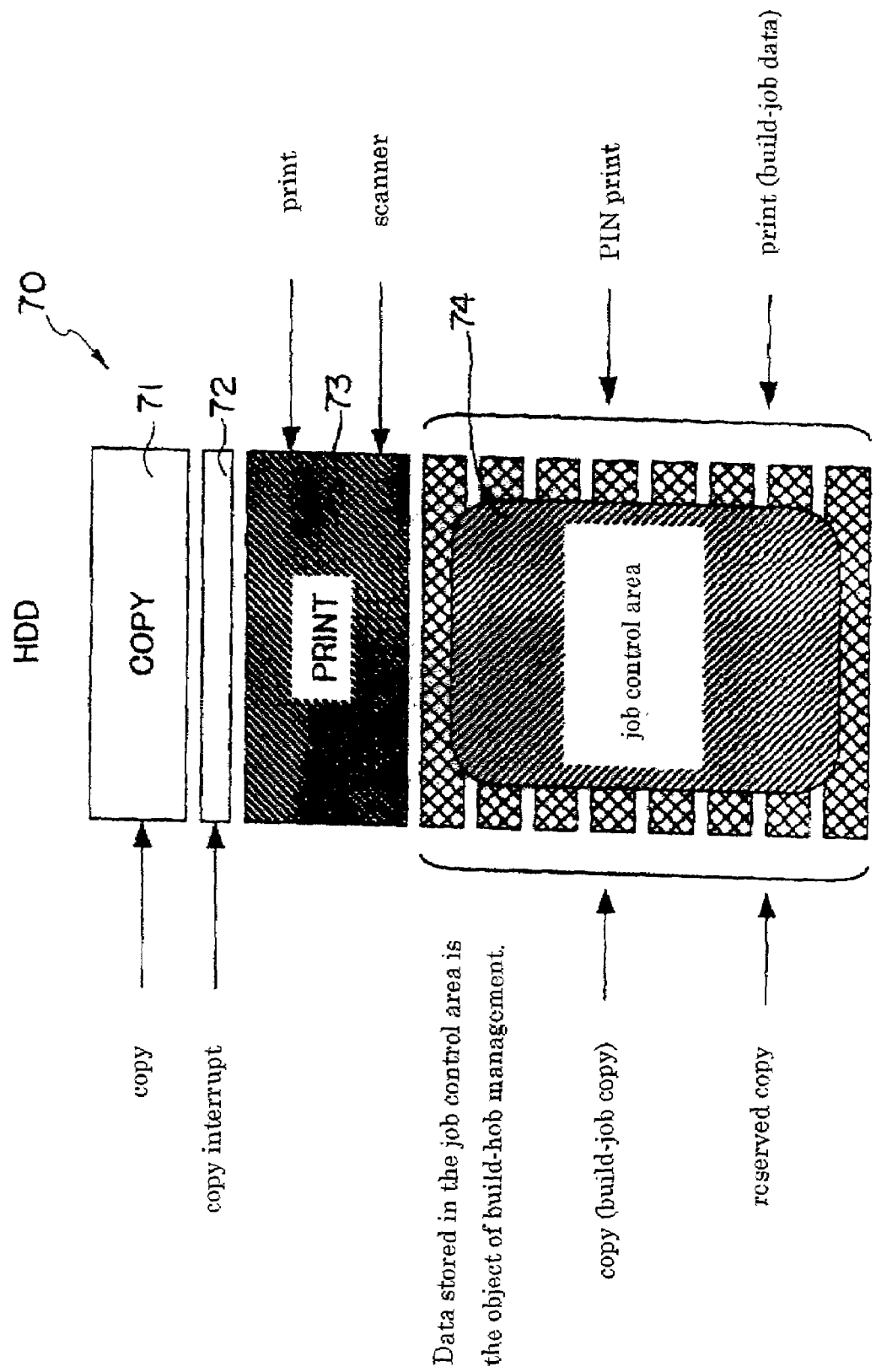
FIG. 4 is an explanatory view showing the status of the memory within the memory unit (HD)

FIG. 4 is an explanatory view showing the control status of each job, showing the typical contents of the memory region 70 provided to the digital compound machine 30. The memory region 70 realized by a hard disk unit and the like comprises a region 71 for storing data during the copy mode, a region 72 for storing data during the interrupt copy mode, a region 73 for storing data during the normal printer mode, and a job control region 74 (job storage means 11).

The job control region 74 temporarily stores, for example, confidential print data, reserved copy mode data where the copy data is stored in advance, and copy or print data to be build-processed according to the present invention.

By operating the build-job button 64 of the control panel 60, of the printing jobs input through the network and stored in the job control region 74, any optional job could be combined with any other optional jobs in any optional order.

In other words, when the build-job button 64 is pressed, the display unit 16 of the control panel 60 indicates stored job data showing information such as the contents of the job stored in the job storage means, as shown in FIG. 5. According to the example of FIG. 5, three printing jobs are stored in the job storage means. The oldest printing job is a copy-mode job, the name of the job is copy 1, the record paper size is A4, the number of pages is 8, with a stapling process designated as the postprocessing, which has been received at 10:20. Similarly, the next printing job is a printer-mode job, the name of the job is report 1, the record paper size is A4, the number of pages is 10, with no postprocessing, which has been received at 10:35. The most recent printing job is a copy-mode job, the name of the job is copy 2, the recording paper size is B4, the number of pages is 2, with no postprocessing, which has been received at 10:38.

Figure 6:
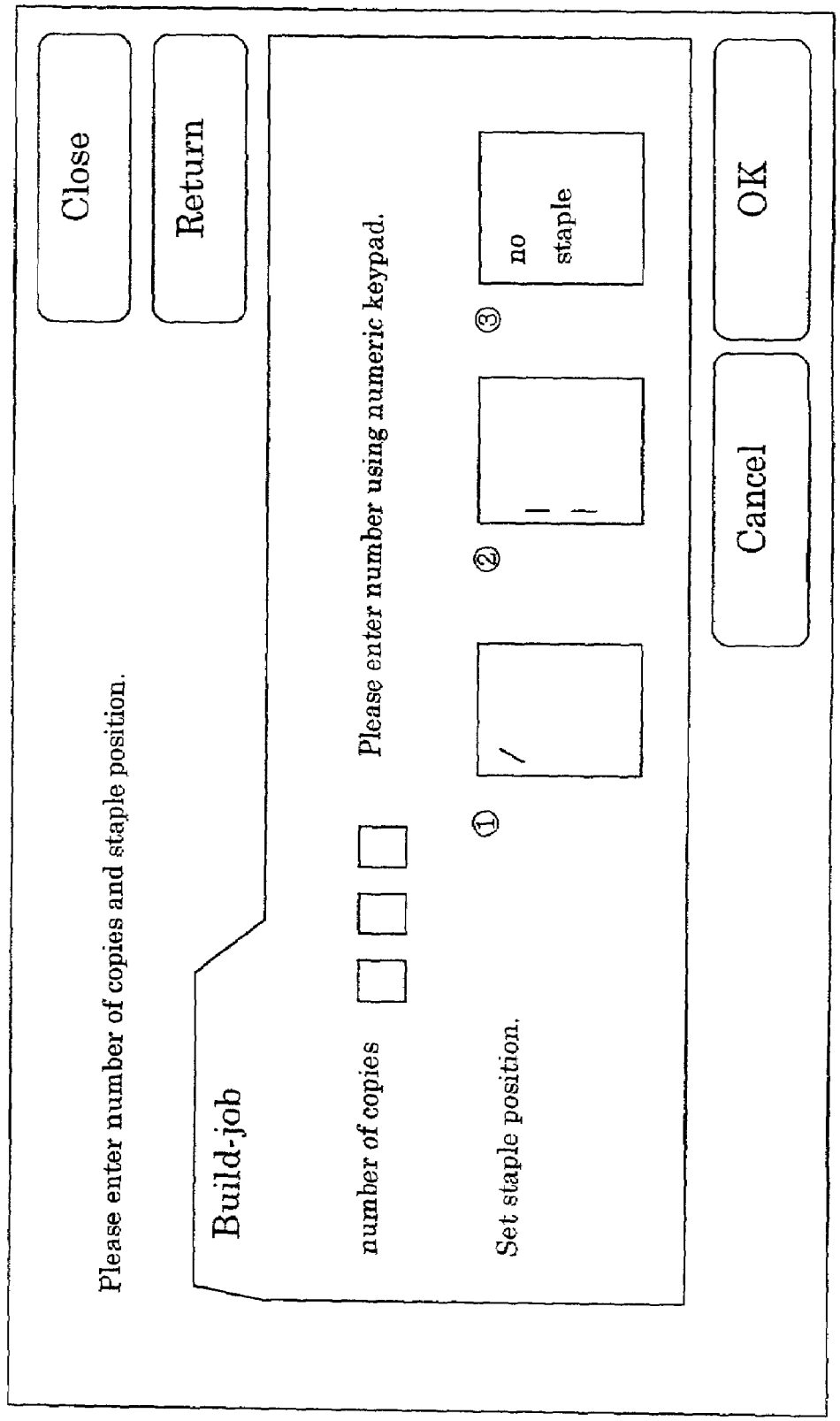
FIG. 6 is an example of the display indicating that the output forms of the jobs differ.

When the jobs to be combined and the order of those jobs are selected on the screen (job select means 12) shown in FIG. 5 (in the example of FIG. 5, report 1 and copy 1 are selected in that order), an output comparison means 14 determines whether or not the contents of the jobs designating the form of output coincide or not, and when they are determined to disagree, the control panel 60 indicates the disagreeing portion and orders correction of the disagreeing portion, as shown in FIG. 6. At this time, for example, the following data may be set, such as the number of copies to be made, whether or not the stapling process should be performed uniformly, or the position of the staples when the stapling process is to be performed uniformly. When the forms of output of all the jobs coincide, only the number of copies to be made could be set at this time.

Figure 7:
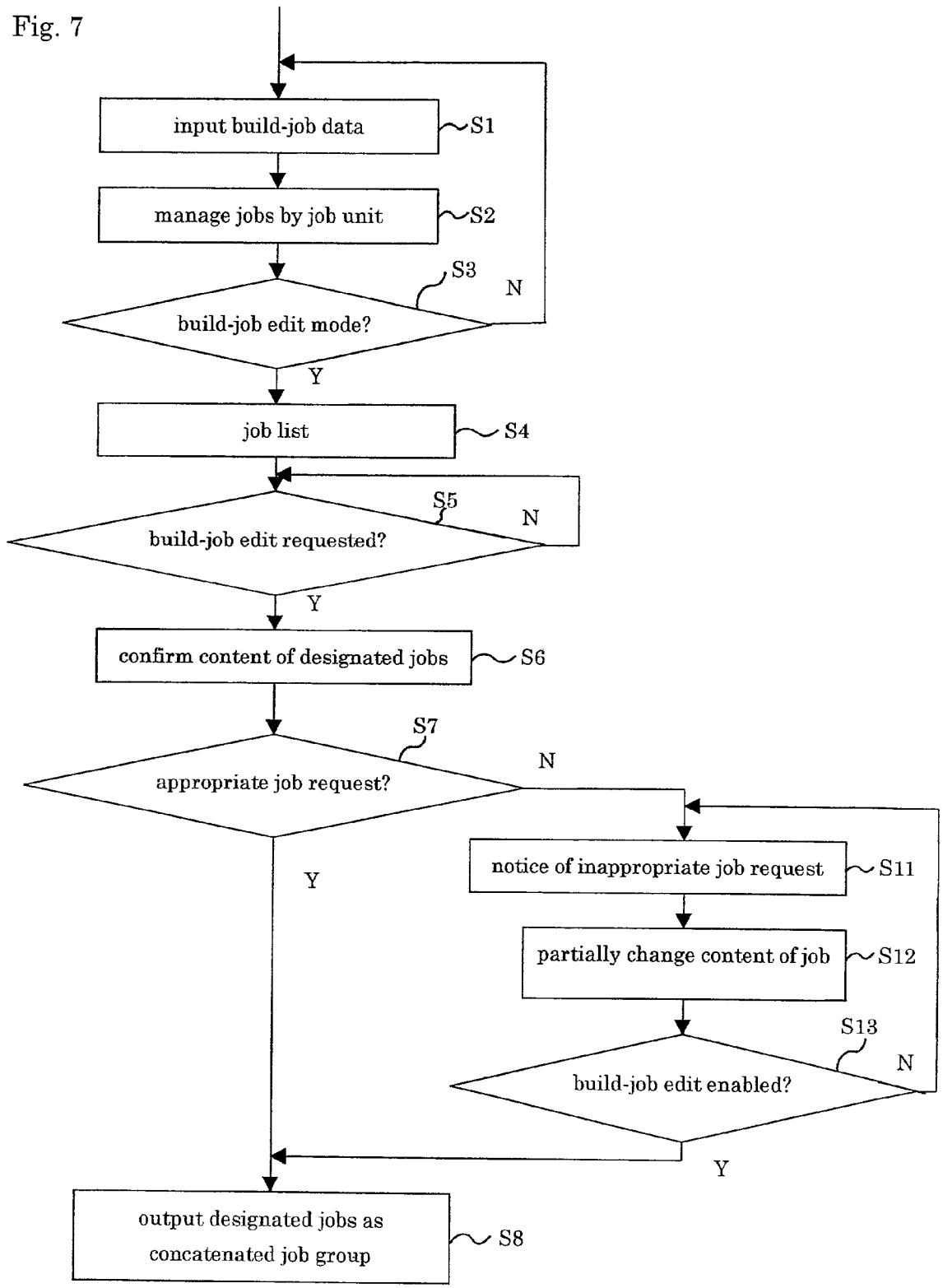
FIG. 7 is a flowchart explaining the build-job process in an image forming device according to the present invention.

The combination process of jobs according to the image forming device (digital compound machine) 30 having the above-explained structure will be explained with reference to the flowchart of FIG. 7. When a printing job (build-job data) is input to the job control region 74 (job storage means 11) through the network (S1), the build-job being input will be handled in job units (S2). Next, determination is made on whether the build-job button 64 has been operated or not (S3). Unless the build-job button 64 is pressed, the procedure returns to step S1, and printing jobs are stored to the job storage means 11 until the build-job button 64 is pressed.

When the build-job button 64 is operated at step S3, the information regarding the stored jobs are read out from the job storage means 11, and a job list as shown in FIG. 5 is indicated on the display means 16 (S4). After indicating the job list, the input of editing order that designates the selection of jobs is monitored (S5). When editing order is input, the forms of image output of respective jobs selected based on the editing order, such as the record paper size, the number of pages, the need for a stapling process or a folding process and the like, are confirmed (S6), and determination is made on whether the forms of image output of all the selected jobs coincide or not (S7).

When it is determined in step S7 that the forms of image output of all the selected jobs coincide, the designated sequence of jobs are concatenated and output (S8).

When it is determined in step S7 that not all the contents of the selected jobs coincide, such as when there is difference in record paper sizes, difference between staple processing and no staple processing, or difference between paper folding process and no folding process, the display means 16 of the control panel 60 indicates on the screen the fact that the output forms differ, and which part of the output form of a job differs from the output forms of the remaining jobs (S11).

Seeing the data on the display means, the operator or user judges whether there is a need to change the form of image output of a job or not. When changing the form of output of the image, the content of the job to be changed (output form command) is input from the output form designation means 17, and when plural jobs are to be output in different forms of output, output form command allowing plural jobs to be output in different forms (S12) is input.

When output form command is input, determination is made on whether or not it is possible to edit the build-job by the changed image output form or the commanded output form (S13). When it is capable in step S13 to edit the build-job, the designated job is combined with other sequential jobs for output (S8), and when it is determined that it is impossible to edit the build-job, the procedure is returned to step S11, where it is indicated that the contents of the job must be changed.

As explained, when outputting various jobs as a combined sequential job, the present invention enables to call the attention of the user so that the forms of output images, such as the record paper sizes, will not be inconsistent. Moreover, since the differences in the conditions of output form of one job compared to the remaining jobs of a group can be indicated clearly and in detail, such as the difference in record paper size and whether or not stapling is requested, a user-friendly display is realized according to the present invention.

Effect of the Invention

The problem of the prior art technique was that when plural printing jobs having different forms of output, for example, one job having an output paper size of A4 and another having an output paper size of B5, were combined as one, they were either automatically unified and output onto paper having the same size, or the output process was interrupted. The present invention solves the problems of the prior art, and indicates on the display when the forms of output of the plural printing jobs differ and further indicates the content of the difference, which allows the user to judge the status of the job and to take appropriate action.

According further to the present invention, not only the postprocessing for all the jobs in a job group, such as stapling, could be selected individually, but different types of postprocessing may be set for each job in the job group, providing even better service to the user.

I claim:

1. An image forming device comprising a job storage means connected to a network and storing a group of jobs composed of image data input through said network for forming images; a job select means for selecting different arbitrary jobs from said group of jobs stored to said job storage means; and a job output means for concatenating said jobs selected by said job select means and outputting said concatenated jobs as one job:

wherein said image forming device further comprises an output form comparison means for comparing the image output forms of each of said jobs selected by said job select means, wherein determination is made on whether the forms of image output of all the selected jobs coincide; an informing means for informing the user of the existence of a job having a different output form when there is a difference; and a control indication means indicating a disagreeing portion and ordering correction of the disagreeing portion.

2. The image forming device according to claim 1, wherein said informing means informs a part of an image output form of said job having the different output form that is different than the forms of other jobs.

3. The image forming device according to claim 1 or 2, wherein the recording material on which said image data is to be reproduced through said job output means can be respectively designated for each of said jobs selected by said job select means.

4. The image forming device according to claim 1, wherein if said different output form is related to a predetermined form, confirmation is made on whether or not to unify the output forms.

5. The image forming device according to claim 1, wherein if said different output form is related to a predetermined form, each of said jobs are output with different output forms but as one sequential job as a whole.

* * * * *